FLOW SHEET OF PROCESS.

NICKEL - COPPER - IRON SULPHIDE ORE + FLUXES ($Fe_2O_3$, $CaO$) + COKE
↓
SMELT IN BLAST FURNACE
↓
MATTE CONTAINING AN EXCESS OF Fe OVER THAT REQUIRED TO FORM FeS, $Ni_3S_2$, $Cu_2S$. SMELT IN REVERBERATORY WITH NaOH OR THE LIKE. CRUSH PRODUCT WET AND PASS OVER CONCENTRATING TABLES:

- SLAG TO DUMP.
- CONCENTRATE: Fe-Ni ALLOY CONTAINING PLATINUM METALS: SMELT WITH $Na_2SO_4$ AND $SiO_2$
  - $Na_2O$, $FeO$, $SiO_2$ SLAG: TO BLAST FURNACE
  - PLATINIFEROUS NICKEL MATTE: FUSE WITH $Na_2CO_3$ IN REVERBERATORY
    - TAILING TO MAGNETIC SEPARATOR
      - MAGNETIC Ni-Fe SULPHIDE: RETURN TO REVERBERATORY.
      - NON-MAGNETIC Ni-Cu-Fe SULPHIDE: BESSEMERIZE TO OBTAIN Cu-Ni MATTE.
    - Na-Cu-Fe SULPHIDES RETURN TO REVERBERATORY.
    - PURIFIED PLATINIFEROUS NICKEL MATTE: DIGEST WITH $H_2SO_4$
      - $NiSO_4$ SOLUTION CRYSTALLISE OUT $NiSO_4 \cdot 7H_2O$
      - PLATINUM SLIMES TO REFINERY.

INVENTORS
ALAN RICHARD POWELL
AND
ERNEST CHARLES DEERING.
by their attorneys
Howson and Howson Patented Jan. 12, 1932                                                    1,841,207

UNITED STATES PATENT OFFICE

ALAN RICHARD POWELL, OF AMERSHAM, AND ERNEST CHARLES DEERING, OF BARNET, ENGLAND, ASSIGNORS TO JOHNSON MATTHEY & COMPANY LIMITED, OF LONDON, ENGLAND

TREATMENT OF ORES, METALLURGICAL PRODUCTS, RESIDUES, AND THE LIKE, FOR THE RECOVERY OF PLATINUM METALS

Application filed April 20, 1929, Serial No. 356,875, and in Great Britain May 1, 1928.

This invention relates to the extraction of the metals of the platinum group from ores, and more especially copper nickel ores, concentrates, mattes, residues, sweeps or the like, containing one or more of the metals.

The ordinary method of working up nickel and copper ores or concentrates comprises smelting them to a matte in reverberatory or blast furnaces and treating the molten matte so obtained with a current of air in a converter of the Bessemer type, whereby the iron is oxidized and slagged off and a concentrated nickel-copper matte (hereinafter referred to as Bessemer matte) is obtained, containing 78 to 82 per cent of copper and nickel, together with only traces of iron. This Bessemer matte is then treated by one of the following methods:—

(A) The matte is smelted with sodium sulphate and carbon (known as top and bottom smelting) whereby a "tops" consisting of sodium-copper sulphide and a "bottoms" consisting of nickel sulphide are obtained. The latter product is roasted and the resulting oxide converted to metal by reduction and the metal is refined electrolytically.

(B) The matte is roasted and copper sulphate removed by leaching, the insoluble nickel oxide being treated by the Mond carbonyl process.

(C) The matte is electrolyzed as it stands or after a preliminary roasting and reduction process.

In cases where the ores contain the platinum metals all these metals are recoverable in the blast furnace matte, though probably some loss of these metals occurs in the conversion process. In treating the Bessemer matte by the method (A) we have found that it is usually very difficult to ensure that all the platinum metals are retained in the nickel matte; in any case their complete recovery from this matte by the usual well-known processes is a difficult and complicated procedure. If the matte is treated by the method (B) part of the platinum metals (especially palladium and platinum) is liable to dissolve in the leaching liquors used to dissolve the copper, the part remaining with the nickel oxide appears, however, to be recovered almost completely in the residues from the carbonyl process. The method (C) should give complete recovery of the platinum metals in the anode slimes, but the process is lengthy and somewhat costly.

Our invention is based on our discovery that at elevated temperatures the platinum metals have a higher affinity for metals of the iron group, than for metal sulphides (i. e. speaking generally mattes) in which they are soluble, and that by the addition of iron or nickel or an alloy thereof to such sulphides or mattes, or by the treatment of such sulphides or mattes in such manner as to liberate a part of the contained iron or nickel, the platinum metals will be collected into an alloy with the free nickel and/or iron (hereinafter called "free metal") and we have further found that by the addition of substances, hereinafter set out, it is possible to cause this free metal to crystallize within the mass of the matte on cooling in such a form that it can be separated from the other constituents of the matte by mechanical means. We also provide means for the further treatment of this free metal, as hereinafter described, in order to concentrate the platinum metals in a still smaller mass. Although our process may be carried out in conjunction with the Bessemer process, we prefer to carry it out on the untreated blast furnace matte.

In the flow sheet accompanying this application we show the various steps of our process when carried out with a blast furnace matte.

*Formation of free metal in the matte*

Three situations may be encountered in attempting to provide the proper proportion of free metal in the matte after the blast furnace smelting.

Situation I is where the constitution of the original matte is such that the conditions in the blast furnace may be regulated in such a manner that the resulting matte will contain the proper amount of free metal.

Situation II where the constitution of the original matte is such that less than the desired proportion of free metal will result in the matte, we either

*a*. Add metals such as iron or nickel or

*b*. Add desulfurizing substances or otherwise reduce the sulphur content to liberate, in a metallic form, the proper amount of free metal. Suitable desulfurizing substances comprise metals having a higher affinity for sulphur than iron or nickel; for example copper, aluminum, manganese, the alkali or alkaline earth metals and the like, or a mixture of substances which will produce one or more of these metals at the temperature of the molten matte. Examples of substances which will produce in the molten matte metals having greater affinity for sulphur than iron or nickel are 1. The oxide or carbonate of the metal, and carbon or other reducing agent, or 2. A mixture of roasted ore or matte and a reducing agent.

Situation III where the constitution of the original matte is such that more than the desired proportion of free metal is found in the resulting matte we decrease the quantity of free metal by melting it with a sulfurizing or an oxidizing agent. For example, the oxidizing agent may be ferric oxide (hæmetite), sodium nitrate (nitre) or the like; and the sulfurizing agents may be sulphur or iron pyrites, or we may use a combined oxidizing and sulfurizing agent such as sodium sulphate, calcium sulphate or magnesium sulphate which in the presence of silica reacts with the free metal as follows:—

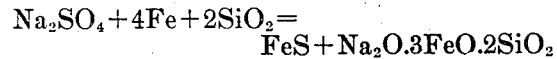

$$Na_2SO_4 + 4Fe + 2SiO_2 = FeS + Na_2O.3FeO.2SiO_2$$

Concerning the amount of free metal

If the original matte contains no nickel the free metal obtained in our process consists essentially of an impure iron containing copper, sulphur and the precious metals. With matte containing nickel the "free metal" obtained will contain a substantial proportion of nickel and we have found that it is advantageous so to adjust the amount of metal added to, or produced from the matte, that the free metal obtained contains less than about 60 per cent of nickel, the remainder being iron with subordinate amounts of copper and sulphur. On the other hand if a Bessemer matte is treated by this process the addition of iron is obviously objectionable and for that reason nickel or copper may be added to it rather than iron, but the matte usually contains sufficient "free metal" if conversion is carried to the stage at which practically all the iron has been eliminated. In such cases the proportion of disintegrating material added (as described in the next paragraph) should be such that the greater part of the copper is converted into a complex compound, e. g. sodium-copper sulphide; in this treatment the copper previously alloyed with the free nickel is converted to a large extent into copper sulphide.

We have found that when an alkali hydroxide, carbonate or sulphide, or mixtures of these are introduced into the molten matte containing the free metal, the free metal crystallizes out in coarse crystals during the cooling of the molten mass. For example, we add to the molten matte an alkali compound, such as sodium carbonate, with or without a carbonaceous reducing material, and pour the matte into bogeys. The product is then broken up and left exposed to the atmosphere for some days, whereby the matte disintegrates and a loose, friable mass is obtained.

The amount of alkali compound required to produce the disintegrating effect varies with the composition of the matte to be treated, but is usually between 5 and 15 per cent, for blast furnace mattes, but if the process is carried out in connection with Bessemer mattes having a high nickel content the per cent of alkali compound may be as low as 2 to 3 per cent.

The "free metal" alloy may be recovered from the loose friable mass by mechanical means, such as classification, treatment on shaking tables, magnetic separation, or by a combination of these processes; or, in order to avoid the possibility of oxidation of the "free metal", we may agitate the broken up mass for several hours under water prior to the mechanical treatment referred to. We have found a combined table treatment and magnetic separation give particularly good results. Disintegration may be hastened if desired by grinding with water in any of the ordinary mills for this purpose.

Somewhat different results are obtained if a small proportion of alkali compound (5–15% for blast furnace matte, 2–3% for Beesemer matte as hereinbefore stated) is used than if a larger proportion of the alkali compound is used (e. g. 25–60%).

Case I

When small proportions of the alkali compound are added (which we shall term, for convenience Case I) we have found that crystallization of the free metal takes place progressively through a wide temperature range during cooling, and that the first crystals which separate carry the greater part of the platinum metals in the molten matte; hence by casting the liquid matte into ladles and allowing it to cool until a crust forms round the inside of the ladle and then pouring off the still molten matte, the solidified portion of matte that remains in the ladle is relatively very much richer in platinum metals than that poured off.

A similar result is obtained by cooling the matte in conical moulds and breaking off the lower portion, or by allowing the matte to cool in the furnace to a temperature at which a portion of the free metal separates out in the form of a sponge which settles to the bottom of the furnace, tapping off the still fluid matte and raking out the sponge separately. Whether the matte is cast in ladles or cooled in conical molds or cooled in the furnace to form a sponge both portions of the separated matte are subjected to disintegration and mechanical treatment, as hereinbefore described. The free metal or alloy obtained in the mechanical treatment consists usually of iron and nickel with subordinate amounts of copper and sulphur together with the platinum metals. By this disintegration and mechanical treatment it is possible to obtain from the lower portions i. e. the crusts or sponge, free metal so rich in platinum metals that it may be worked up by fusion with sodium-sulphate and silica, into a nickel matte which is amenable to direct wet treatment for the recovery of the platinum metals and nickel as hereinafter described. At the same time a large quantity of alloy relatively poor in platinum metals (i. e. containing about the same proportion or as less than the original matte) is recovered from the top portion, and this alloy may be added as a collector to further quantities of the original matte.

Case II

When larger proportions, e. g. 25 to 60 per cent of the alkali compound are added to a blast furnace matte in the reverberatory treatment, (which may for convenience be termed Case II) separation of the molten mass into two layers takes place in a manner similar to the "top and bottom" smelting process described under (A) and the top layer contains an appreciable quantity of the platinum metals. What we have discovered is that if sodium carbonate, sulphide or hydroxide, with or without carbon, is used and provided that the original matte contains a proportion of free metal, or that free metal is added to or caused to be formed in the charge in the furnace, then the platinum metals go into the lower nickel sulphide layer instead of into the top layer.

The nickel mattes obtained according to this invention in the case where the larger proportions of alkali compounds are used (Case II) consist essentially of nickel sulphide containing free metal rich in nickel and carrying the platinum metals. Such mattes disintegrate relatively slowly and we have found it necessary in this case to crush the matte in a wet grinding mill, for example in a tube mill or Hardinge mill, in order to liberate the alloy from the sulphides. The alloy may then be separated from the remaining sulphides by magnetic separation.

Concentration of the platinum metals

In order to concentrate the platinum metals and nickel in the low nickel alloy obtained when the low percentage of alkali is used (Case I) as above described we have found that by smelting the alloy with an alkali or alkaline earth sulphate and silica, with or without the addition of other fluxes, such as oxides or carbonates of the alkalis or alkaline earths, the greater part of the iron can be slagged off leaving a nickel sulphide matte still containing free metal in which the platinum metals are still further concentrated. Such a matte can be ground and the free metal separated magnetically from the non-magnetic nickel sulphide of relatively high purity from which nickel may be recovered by any of the known processes.

To concentrate the platinum metals in a high nickel alloy as for example that obtained in the modified (A) process (Case II), or from a Bessemer matte, it is smelted with sulphur or sulphur bearing material, in such proportions that the greater part of the nickel alloy is converted to sulphide leaving about 10 to 20 per cent of free metal in the resulting matte. This matte is then treated as described for treating Bessemer mattes for the recovery of a metal concentrate.

The concentration can obviously be repeated as many times as desired in order to obtain a sufficiently high proportion of platinum metals in the free metal to repay the cost of recovery by wet chemical methods, e. g. electrolysis or solution in acids, in which a sludge of platinum metals is obtained suitable for the ordinary refining operations. For example this free metal may be dissolved by digestion with hot sulphuric or hydrochloric acid whereby a solution of nickel sulphate or chloride and a residue of the platinum metals are obtained. Alternatively it may be smelted to a nickel matte with sodium sulphate and silica or with sulphur if the iron content is low and this matte may be treated by fusion with alkali carbonate or hydroxide as previously described in order to purify it by removing the small amounts of iron and copper which it still retains. After this treatment the nickel matte dissolves readily by digestion with hot sulphuric acid of about 20 to 30 per cent concentration by weight giving a solution from which pure nickel sulphate may be obtained by crystallization and a sludge containing all the platinum metals partly in the form of free metal and partly as sulphide which sludge is amenable to ordinary refining operations.

The recovery of the platinum metals from ores, residues sweeps and the like substantially free from nickel has been hitherto usually effected by smelting them with materials containing lead in a blast or reverberatory furnace to obtain a lead regulus which collects the precious metals. Platinum, palladium and rhodium form a true alloy with the lead, but iridium, ruthenium and osmium remain simply in suspension, or settle to the bottom of the lead. Hence it often occurs that in tapping the furnace, part of the three last named metals remain in the hearth or well of the furnace.

We have found that by smelting such platiniferous materials with materials which will produce a matte containing iron, with or without nickel and/or copper, and having a deficiency of sulphur so that part of the iron or nickel is in the free metallic form dissolved in an excess of the metal sulphides, all the platinum metals may be collected in the matte, which is then ready for treatment by one of the processes according to this invention as already described.

What we claim is:—

1. A process for the recovery of platinum metals from ores, mattes or the like containing them in association with one or more of the sulphides of Ni, Cu, Fe, comprising smelting to a matte containing the precious metals and then forming within the matte a proportion of free metal of the iron group which acts as a collector for the platinum metals, adding a disintegrating agent, crushing the matte, and separating the metal from the sulphides by mechanical means.

2. The process for the recovery of platinum metals from ores, mattes or the like containing them in association with one or more of the sulphides of Ni, Cu, and Fe, comprising smelting to a matte containing the precious metals, and then providing within the matte a proportion of free metal of the iron group which acts as a collector for the platinum metals, adding a disintegrating agent, crushing the matte, and separating the metal from the sulphides by mechanical means.

3. A process for the recovery of platinum metals from residues and ores containing them and which are substantially free from copper and nickle which comprises smelting such residues and ores with matte forming materials to a matte containing the precious metals, and then providing within the matte a proportion of free metal of the iron group which acts as a collector for the platinum metals, adding a disintegrating agent, crushing the matte, and separating the metal from the sulphide by mechanical means.

4. A process for the recovery of platinum metals from ores, residues or the like, comprising smelting the said ores, residues or the like under such conditions as to obtain a matte having a deficiency of sulphur so that part of the iron or nickel contained therein is in the free metallic form dissolved in an excess of the sulphides, adding a disintegrating agent and crushing the matte and separating the metal from the sulphides by mechanical means.

5. The process for the recovery of platinum metals from ores, mattes or the like, containing them in association with one or more of the sulphides of nickel, copper and iron, comprising smelting to a matte containing the precious metals and then producing within the matte a proporton of free metal of the iron group or an alloy containing said metals by the addition of desulfurizing agents, adding a disintegrating agent, crushing the matte and separating the metal from the sulphides by mechanical means.

6. The process for the recovery of platinum metals from ores, mattes or the like containing them in association with one or more of the sulphides of nickle, copper and iron, comprising smelting to a matte containing the precious metals, and then producing within the matte a proportion of free metal of the iron group or an alloy containing said metals by the addition of a desulfurizing agent comprising a mixture of a reducing agent and a portion of the matte which has previously been roasted, adding a disintegrating agent, crushing the matte and separating the metal from the sulphides by mechanical means.

7. The process for the recovery of platinum metals from ores, mattes or the like containing them in association with one or more of the sulphides of nickle, copper and iron, comprising smelting to a matte containing the precious metals and then forming within the matte a proportion of free metal of the iron group by the addition of an alkali or alkaline earth compound together with carbon then crushing the matte and separating the metal from the sulphides by mechanical means.

8. The process for the recovery of platinum metals from ores, mattes or the like containing them in association with one or more of the sulphides of nickel, copper and iron, comprising smelting to a matte containing the precious metals and, in cases when the matte contains more than the desired proportion of free metal, reducing the said proportion by adding a sulphurizing agent, adding a disintegrating agent, crushing the matte and separating the metal from the sulphides by mechanical means.

9. The process for the recovery of platinum metals from ores, mattes or the like containing them in association with one or more of the sulphides of nickel, copper and iron, comprising smelting to a matte containing the precious metals and, in cases when the matte contains more than the desired proportion of free metal, reducing the said proportion by adding an oxidizing agent, adding a disintegrating agent, crushing the matte and separating metal from the sulphides by mechanical means.

10. The process for the recovery of platinum metals from ores, mattes or the like containing them in association with one or more of the sulphides of nickel, copper and iron, comprising smelting to a matte containing the precious metals and, in cases when the matte contains more than the desired proportion of free metal, reducing the said proportion by adding a combined sulphurizing and oxdizing agent, adding a disintegrating agent, crushing the matte and separating the metal from the sulphides by mechanical means.

11. The process for the recovery of platinum metals from ores, mattes or the like containing them in association with one or more of the sulphides of nickel, copper and iron, comprising smelting to a matte containing the precious metals and then providing within the matte a proportion of free metal of the iron group which acts as a collector for the platinum metals, adding an alkali compound as a disintegrating agent, crushing the matte, and separating the metal from the sulphides by mechanical means.

12. The process for the recovery of platinum metals from ores, mattes or the like containing them in association with one or more of the sulphides of nickel, copper and iron, comprising smelting to a matte containing the precious metals and then providing within the matte a proportion of the free metal of the iron group which acts as a collector for the platinum metals, adding a quantity of alkali compound in the amount of 25% to 60% approximately; to cause separation of the matte into a layer of nickel sulphide containing free metal and a layer of alkali copper and iron sulphide, then crushing the nickel sulphide layer and separating the metal from the sulphides by mechanical means.

13. In the process for the recovery of platinum metals from ores, mattes or the like containing them in association with one or more of the sulphides nickel, copper and iron the step of melting the matte containing free metal of the iron group together with a disintegrating agent in a reverberatory furnace, allowing the material to cool to such a temperature that part of the free metal separates in the form of a sponge, which contains the greater part of the platinum metals, tapping the top portion and the sponge separately and working up both products separately for the recovery of free metal.

14. In the process for the recovery of platinum metals from ores, mattes or the like containing them in association with one or more of the sulphides, nickel, copper and iron, the step of melting the matte containing free metal together with a disintegrating agent in a reverberatory furnace, allowing the material to cool to such a temperature that part of the free metal separates in the form of a sponge, which contains the greater part of the platinum metals, tapping the top portion and the sponge separately and working up both products separately for the recovery of free metal, together with the step of returning the metal from the top portion to a fresh charge of matte in the reverberatory furnace to act as collector for more platinum metals.

15. In the process for the recovery of platinum metals from ores, mattes or the like comprising providing within the matte a portion of free metal of the iron group which acts as a collector of the platinum metals and then treating the free metal by smelting it with sodium sulphate and silica in such proportions as to obtain a second matte containing the platinum metals and then adding a disintegrating agent, crushing the matte, and separating the metal from the sulphides by mechanical means.

15. In the process for the recovery of platinum metals from ores, mattes or the like containing them in association with one or more of the sulphides of nickel, copper and portions as to obtain a second matte containing the precious metals, providing within the matte a portion of free metal of the iron group which acts as collector of the platinum metals, and concentrating the platinum metals by melting the free metal with a sulfurizing agent, and then adding a disintegrating agent, crushing the matte and separating the metal from the sulphides by mechanical means.

17. In a process for the recovery of platinum metals from ores, mattes or the like, comprising providing within the matte a portion of free metal of the iron group which acts as a collector of the platinum metals, smelting the free metal with sodium sulphate and silica, fusing the nickel matte or free metal with alkali carbonate or hydroxide to purify it of iron and copper, and digesting the final nickel matte or free metal with acid to obtain a sludge of precious metals amenable to ordinary refining operations.

In testimony whereof we have signed our names to this specification.

ALAN RICHARD POWELL.
ERNEST CHARLES DEERING.

CERTIFICATE OF CORRECTION.

Patent No. 1,841,207.  Granted January 12, 1932, to

ALAN RICHARD POWELL ET AL.

It is hereby certified that error appears in the printed specification of the above numbered patent requiring correction as follows: Page 3, line 26, for the words "or as" read as or; page 5, line 87, for the ordinal "15" read 16, and line 91, strike out the words "portions as to obtain a second" and insert iron comprising smelting to a; and that the said Letters Patent should be read with these corrections therein that the same may conform to the record of the case in the Patent Office.

Signed and sealed this 29th day of March, A. D. 1932.

(Seal)

M. J. Moore,
Acting Commissioner of Patents.